United States Patent [19]

Sugo et al.

[11] Patent Number: 5,425,866
[45] Date of Patent: Jun. 20, 1995

[54] ELECTRICALLY REGENERABLE DEMINERALIZING APPARATUS

[75] Inventors: Takanobu Sugo; Isao Ishigaki, both of Gunma; Kunio Fujiwara, Kanagawa; Hideaki Sekiguchi, Chiba; Hideo Kawazu; Takayuki Saito, both of Kanagawa, all of Japan

[73] Assignees: Ebara Corporation; Japan Atomic Energy Research Institute, both of Tokyo, Japan

[21] Appl. No.: 153,967

[22] Filed: Nov. 18, 1993

Related U.S. Application Data

[63] Continuation of Ser. No. 850,263, Mar. 12, 1992, Pat. No. 5,308,467.

[30] Foreign Application Priority Data

| Mar. 13, 1991 | [JP] | Japan | 3-47951 |
| Mar. 13, 1991 | [JP] | Japan | 3-47953 |
| Mar. 13, 1991 | [JP] | Japan | 3-47954 |

[51] Int. Cl.$^6$ ............................................. B01D 61/44
[52] U.S. Cl. ............................... 204/301; 204/252; 521/25; 521/28; 521/29
[58] Field of Search .................. 204/252, 301; 521/25, 521/28, 29

[56] References Cited

U.S. PATENT DOCUMENTS

| 2,812,300 | 11/1957 | Pearson | 204/131 |
| 3,723,306 | 3/1973 | Bridgeford | 210/22 |
| 4,385,130 | 5/1983 | Molinski et al. | 521/31 |
| 4,605,685 | 8/1986 | Momose et al. | 522/124 |

Primary Examiner—John Niebling
Assistant Examiner—Arun S. Phasge
Attorney, Agent, or Firm—Oblon, Spivak, McClelland, Maier & Neustadt

[57] ABSTRACT

The improved electrically regenerable demineralizing apparatus uses ion exchangers that are produced by radiation-initiated graft polymerization and that are packed in the demineralizing compartment of an electrodialyzer. The apparatus may use a mosaic ion exchanger that consists of alternately arranged cation- and anion-exchange groups. Alternately, the apparatus may have an immobilized amino acid packed in the demineralizing compartment of an electrodialyzer. The apparatus maintains consistent water quality for a prolonged time, is capable of treating from small to large volumes of water and yet is easy to service and manage.

10 Claims, 2 Drawing Sheets

ELECTRICALLY REGENERABLE DEMINERALIZING APPARATUS

This is a continuation, of application Ser. No. 07/850,263, filed on Mar. 12, 1992 now U.S. Pat. No. 5,308,467.

BACKGROUND OF THE INVENTION

This invention relates to an apparatus for removing ions from liquids that is suitable for use in such applications as the production of pure water in power plants (e.g. nuclear power plants), semiconductor fabrication and the production of pharmaceuticals, as well as the demineralization of concentrated liquids in the process of food and chemicals production.

There are three basic methods for removing ions from liquids, and they are reverse osmosis, electrodialysis and ion exchange. It is generally held that demineralization of seawater and other liquids of high salt concentration can advantageously be achieved by electrodialysis whereas reverse osmosis is advantageous for demineralization of liquids of lower salt concentrations. For demineralization of liquids of still lower concentrations, ion exchange is advantageous.

The conventional method of electrodialysis uses the potential difference as a drive force for transporting ions, so it has had the disadvantage that the current efficiency decreases at lower ion concentrations. Hence, the liquid treated by electrodialysis cannot be demineralized to a lower concentration than several hundred ppm. To solve this problem, a method was proposed in which the current efficiency was to be improved by packing an ion exchanger in the demineralizing compartment (U.S. Pat. No. 2,815,820 to Kollsman). This proposal was made more than 80 years ago but it has not been commercialized since it has many problems as exemplified by scale deposition on membranes and ion-exchange resins.

However, the electrically regenerable demineralizing apparatus has recently gained a new look for various reasons including the improvement in the performance of membranes, the advancement of pretreatment methods, the industrial demand for demineralizing apparatus that do not require complicated equipment for regeneration and the social demand for less consumption of resources and energy. Under the circumstances, an improved version of the early model of electrically regenerable demineralizing apparatus has been proposed (U.S. Pat. No. 4,632,745 to Millipore Corporation) and is available on the market.

The current model of electrically regenerable demineralizing apparatus has a mixture of cation- and anion-exchange resins packed in the demineralizing compartment. Ion-exchange resins are spherical beads having a diameter of 0.4–0.6 mm, so packing them uniformly in the space defined by two sheets of ion-exchange membrane and stacking a plurality of such cells to form a filter press involves a process operation that is very cumbersome and requires utmost care. If ion-exchange resins and fragments thereof leak from an end of the frame, the purity of the demineralized water will decrease. As a further problem, the liquid to be treated cannot be permitted to flow at a very high rate because the increase in the differential pressure is substantial. Some of the conventional electrically regenerable demineralizing apparatus are so adapted as to enable backwashing of contaminated or compacted ion-exchange resin layers but dispersing both cation- and anion-exchange resins uniformly is more difficult than it first appears. The most crucial reason for packing ion-exchange resins is to facilitate the transport of ions, and if the two types of ion-exchange resins separate from each other or if their presence is localized. The number of passageways available for ion transport may decrease to such an extent that it is no longer possible to attain the desired purity. Another problem with the conventional apparatus concerns the maintenance aspect and it is difficult to remove only the cell that is defective and which hence must be replaced.

Under these circumstances, it has generally been held that the electrically regenerable demineralizing apparatus is only adapted for limited applications where the capacity is small as on the laboratory scale and there are no strict requirements for the final water quality.

SUMMARY OF THE INVENTION

An object, therefore, of the present invention is to provide an electrically regenerable demineralizing apparatus that has solved the various problems associated with the packing of ion-exchange resins, that maintains consistent water quality for a prolonged period, that is capable of treating from small to large volumes of water, and that yet is easy to service and manage.

According to one aspect, the present invention attains the above-stated object by an electrically regenerable demineralizing apparatus characterized in that ion exchangers produced by radiation-initiated graft polymerization are packed in the demineralizing compartment of an electrodialyzer.

According to another aspect, the present invention attains the same object by an electrically regenerable demineralizing apparatus characterized in that a mosaic ion exchanger consisting of alternately arranged cation- and anion-exchange groups in packed in the demineralizing compartment of an electrodialyzer.

According to yet another aspect, the present invention attains the same object by an electrically regenerable demineralizing apparatus characterized in that an immobilized amino acid is packed in the demineralizing compartment of an electrodialyzer.

DETAILED DESCRIPTION OF THE INVENTION

Figure 1:
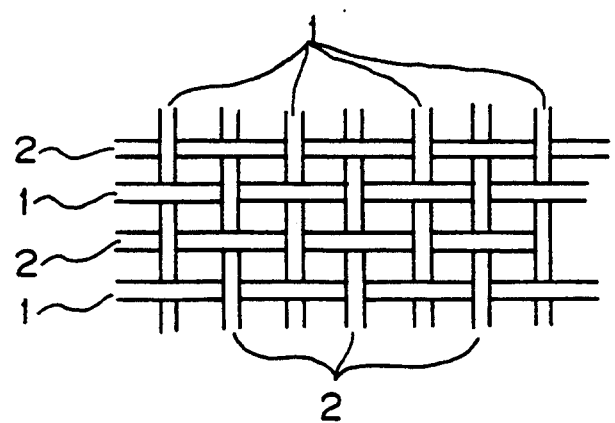
FIG. 1 is a diagram showing a fabric in which bundles of cation-exchange fibers are woven alternately with bundles of anion-exchange fibers.

The first aspect of the present invention is described below in detail. The ionizing radiations to be used in radiation-initiated graft polymerization include α-rays, β-rays, Y-rays, electron beams and ultraviolet rays. Although any of these radiations can be used, Y-rays and electron beams are particularly suitable for the purposes of the present invention.

Although any organic high polymers can be used in radiation-initiated graft polymerization, particularly suitable are polyolefins as typified by polyethylene and polypropylene, halogenated polyolefins as typified by PTFE and polyvinyl chloride, and olefin-halogenated olefin copolymers as typified by an ethylene-tetrafluoroethylene copolymer. These organic high polymers are collectively referred to as "polyolefins".

Radiations may be applied to the substrate either by a simultaneous irradiation method in which a radiation of interest is applied in the presence of both the substrate and a monomer to be polymerized or by a pre-irradiation method in which the substrate is first irradiated and then contacted with a monomer to be polymerized. The pre-irradiation method is more advantageous since it causes less production of a homopolymer of the monomer.

Radiation-initiated graft polymerization is generally advantageous for use in the present invention. As its name suggests, a graft polymer when viewed microscopically has graft side chains attached to the backbone chain of the substrate by covalent bonding. If functional groups are introduced in the polymer, a new function can be imparted while maintaining the physicochemical properties of the backbone chain in the substrate. In order to retain the bead form and maintain the physical strength, conventional ion-exchange resins have been produced using a crosslinking agent such as divinylbenzene to form a three-dimensional network structure. Hence, ion-exchange groups introduced in this structure have small mobility. In polymers produced by radiation-initiated graft polymerization, graft chains having ion-exchange groups are not crosslinked, so they have high mobility and permit efficient movement of counter-ions.

Another reason that makes radiation-initiated graft polymerization suitable for use in the present invention is that it provides fairly great latitude in selection of the substrate shape, thereby permitting one skilled in the art to select a membrane, a fiber or any other shape of substrate that is appropriate for the purposes of the present invention.

Selecting a substrate in fiber form has the following advantages. Monofilaments, woven or nonwoven fabrics which are assemblies of monofilaments, and fabricated articles thereof, that have ion-exchange groups introduced by radiation-initiated graft polymerization, can be readily loaded in the demineralizing compartment between ion-exchange membranes, after being optionally molded into a more appropriate shape. This provides greater ease in increasing the size of equipment. If the length of fibers is extremely short, their characteristic features are lost, making it difficult to handle them in the same manner as powders. Therefore, the Fiber length is preferably longer than the distance between adjacent ion-exchange membranes. The fibers usually have a circular cross section but fibers or fiber assembles having a larger surface area such as those with a star-shaped cross section, a cruciform cross section and hollow fibers may be selected as appropriate for a specific object in consideration of such factors as the quality of raw water and the increase of pressure loss.

For ions to be transported through ion-exchange resins to reach an adjacent membrane, resins of similar types must be located close to each other. If ion-exchange resins of dissimilar types are used in admixture, they can potentially separate from each other during manufacture or back washing. Even if they are mixed together in an ideal state, the resins will contact each other only at points, so in order for ions to be transported, they must pass through many channels that are very narrow.

In ion-exchange fibers produced by radiation-initiated graft polymerization, ion channels are insured as continuous entities that extend from one ion exchange membrane to an adjacent one and consistent water treatment can be achieved to provide good quality. Selection of fiber diameter and packing density depends on various factors such as flow rate, pressure loss and current efficiency and a suitable substrate may be selected or a selected substrate may be further processed. Woven or nonwoven Fabrics which are fiber assembles can also be used as spacers by loading them between membranes and this offers the advantage of facilitating the operations of assembly, maintenance and inspection of equipment in the production process.

Besides fibers, reticular materials such as nets or fabricated articles thereof and membranous materials or fabricated articles thereof can also be used as substrates and they have the same advantages as those described above in connection with fibers. Other substrate materials that are advantageous for use in tile present invention include porous materials such as sponges and foams, as well as fabricated articles thereof.

Ion exchangers produced by radiation-initiated graft polymerization may be the sole ion exchanger that is employed in the electrically regenerable demineralizing apparatus. If desired, such ion exchangers may be used in combination with ion exchangers that are not produced by radiation-initiated graft polymerization, such as conventional ion-exchange resins, and a proper selection can be made in consideration of various factors including use and economy.

For practical purposes, ion-exchange groups to be introduced in the substrate may be selected from among common acidic and basic ion-exchange groups, including cation-exchange groups such as a sulfone group, a carboxyl group and a phosphoric acid group, and anion-exchange groups such as a strong basic quaternary ammonium group and a weak basic group containing a lower amine. A suitable ion-exchange group can be selected in consideration of various factors such as the kind of liquid to be treated and the required quality of water. The ion-exchange groups listed above may be introduced into the substrate either by grafting monomers having the necessary ion-exchange groups or by first grafting monomers that permit easy introduction of ion-exchange groups and then introducing those ion-exchange groups by a secondary reaction.

Monomers having ion-exchange groups consist of those having cation-exchange groups and those having anion-exchange groups. Monomers having cation-exchange groups include but are not limited to acrylic acid, methacrylic acid, crotonic acid, iraconic acid, sodium vinylsulfonate, sodium arylsulfonate, sodium styrenesulfonate, 2-acrylamide-2-methylpropanesulfonic acid and phosphorus-containing acrylic acid esters. Monomers having anion-exchange groups include but are not limited to arylamines, quaternized chloromethylstyrene and aminoalkyl esters of acrylic acid.

Monomers that permit introduction of ion-exchange groups include but are not limited to styrene, chloromethylstyrene, vinylpyridine, glycidyl acrylate, glycidyl methacrylate, acrylonitrile and acrolein.

In order that the cation and anion exchangers produced by radiation-initiated graft polymerization are loaded in the demineralizing compartment, the ion-exchange groups present must be dispersed uniformly and this requires further processing. In the case of ion-exchange fibers, monofilaments of the two types of ion exchanger may be cut to given lengths and mixed together, but this does not help the ion-exchange fibers exhibit their characteristic features. To solve this problem, cation- and anion-exchange fibers may be interwoven into a fabric or a woven or nonwoven fabric which is an assembly of monofilaments need be further molded into a more appropriate shape. Non-fibrous materials such as reticular materials, membranous materials and porous materials, as well as fabricated articles thereof can also be molded with ease. Therefore, a substrate that complies with a specific object can be selected in consideration of various factors such as the quality of water to be treated and the required quality of water, as well as the flow rate For treatment and the pressure loss. It is also possible to select an appropriate method of fabricating substrate materials before loading them in the demineralizing compartment.

FIG. 1 is a diagram showing a fabric in which bundles of cation-exchange fibers are woven alternately with bundles of anion-exchange fibers. The fabric can be handled as a sheet and this provides ease in maintenance and management while, at the same time, it contributes to the increase in equipment size. Shown by 1 in FIG. 1 is a bundle of cation-exchange fibers and 2 is a bundle of anion-exchange fibers.

Figure 2:
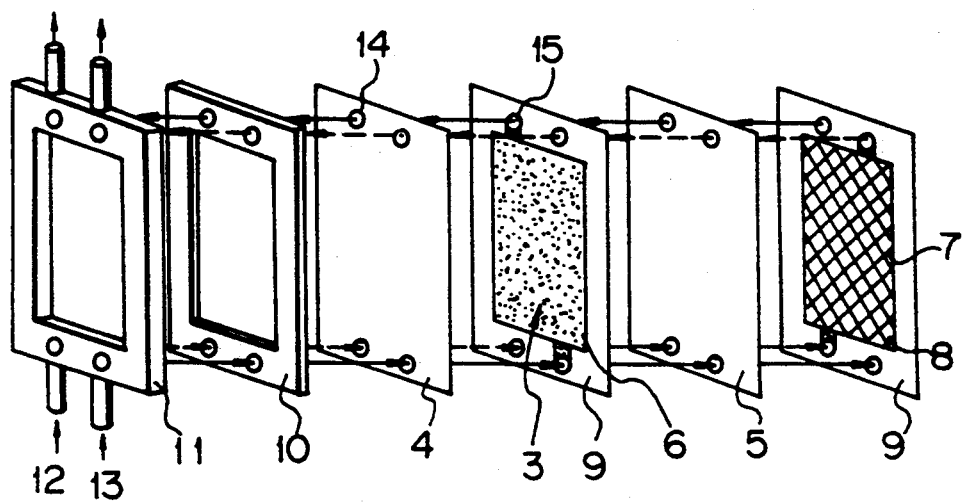
FIG. 2 is a diagram showing a nonwoven fabric that is composed of both cation- and anion-exchange fibers and that is loaded a demineralizing compartment.

FIG. 2 is a diagram showing an exemplary electrically regenerable demineralizing apparatus that is loaded with an ion exchanger prepared by using radiation-initiated graft polymerization in accordance with the present invention. As shown, the apparatus comprises a nonwoven fabric 3 formed of cation- and anion-exchange fibers, an anion-exchange membrane 4, a cation-exchange membrane 5, a demineralizing compartment 6 in which the fabric 3 is loaded, a concentrating compartment 7, a spacer 8, gaskets 9, a clamping frame 10, and a liquid supply frame 11. Shown by 12 is a concentrated liquid, and 18 is a demineralized liquid, 14 is a liquid supply/drain hole, and 15 is a liquid supply/drain groove.

The electrically regenerable demineralizing apparatus according to the second aspect of the present invention is characterized in that a mosaic ion exchanger consisting of alternately arranged cation- and anion-exchange groups is packed in the demineralizing compartment of an electrodialyzer.

It is not impossible for the prior art technology to produce an ion exchanger in which cation- and anion-exchanger groups are alternately arranged in a mosaic pattern. However, radiation-initated graft polymerization is an optimum technique to employ since it is capable of providing an ion exchanger in the form of a fiber or porous material which are suitable for the purposes of the present invention. This technique is also preferred in consideration of the problems that are encountered, either in a technological aspect or from a practical viewpoint, in alternately arranging cation- and anion-exchange groups.

As described hereinabove, radiation-initiated graft polymerization is an advantageous method to adopt in the present invention. As discussed below, the present invention achieves further optimization by making effective use of another feature of radiation initiated graft polymerization.

Radiation-initiated graft polymerization has the advantage of providing fairly great latitude in selection of substrate's shape. However, if a cation exchanger and an anion exchanger are separately prepared by radiation-indiated graft polymerization, they must be further fabricated before loading in the demineralizing compartment in order to meet the requirement for a uniform dispersion of ion-exchange groups. Thus, it has sometimes occurred that monofilaments of ion-exchange fibers or nonwoven fabrics thereof must be cut to lengths for mixing or weaving in order to disperse the two types of ion-exchange groups.

A second feature of radiation-initiated graft polymerization is that it permits the reaction site to be controlled in a very easy manner by various methods including the selection of a proper radiation source, shielding during irradiation, and proper contact with the polymerizable monomer to be reacted. The ionizing radiations to be used in radiation-initiated graft polymerization include $\alpha$-rays, $\beta$-rays, Y-rays, electron beams and ultraviolet rays. Although any of these radiations can be used, Y-rays and electron beams are particularly suitable for the purposes of the present invention.

Figure 4:
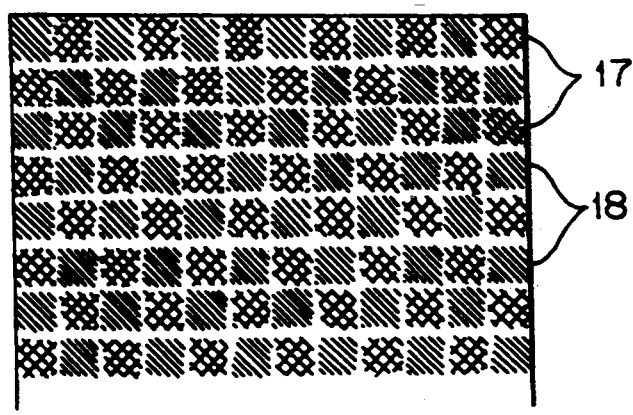
FIG. 4 is a diagram showing an ion exchanger that is produced using the shielding member shown in FIG. 8 and that comprises a mosaic arrangement of cation- and anion-exchange groups.

The mosaic ion exchanger in which cation- and anion-exchange groups are arranged alternately may be produced using electron beams by the following typical process. First, a shielding member that is made of a material such as lead that is impervious to electron beams and which has openings 16 spaced at given intervals as shown in FIG. 8 is placed on top of the substrate and electron beams are applied through that shielding member. Then, a monomer having cation-exchange groups or a monomer capable of being converted to cation-exchange groups is brought into contact with the substrate, optionally followed by a secondary treatment, so as to introduce the necessary cation-exchange groups. Thereafter, the same shielding member is replaced in such a way as to just hide the introduced cation-exchange groups, and electron beams are applied. Subsequently, a monomer having anion-exchange groups or a monomer capable of being converted to anion-exchange groups is brought into contact with the substrate, so that the necessary anion-exchange groups are introduced in the areas where cation-exchange groups were not introduced in the previous step. As shown in FIG. 4, the thus prepared ion exchanger comprises a mosaic pattern of cation-exchange groups 17 and anion-exchange groups 18. Since the substrate needs no secondary processing, its inherent properties are wholly retained.

The electrically regenerable demineralizing apparatus according to the third aspect of the present invention is characterized in that an immobilized amino acid is packed in the demineralizing compartment of an electrodialyzer.

Amino acids are also known as aminocarboxylic acids and as their name implies, amino acids contain both an amino group and a carboxylic group and, hence, show an amphoteric property, having an ion-exchange capacity for both cations and anions. Therefore, if an immobilized amino acid is used as a packing material in the demineralizing compartment of an electrically regenerable demineralizing apparatus, the need for packing both a cation exchanger and an anion exchanger is eliminated.

Substrates having amino acids immobilized thereon are most typically used as beads. Although beads can be used, the aforementioned problems associated with the bead shape cannot be solved, so it is preferred to use amino acid immobilizing substrates in a fibrous or reticular form. Since radiation-initiated graft polymerization provides fairly great latitude in the selection of substrates shape, it is an immobilization technique that can advantageously be used for the purposes of the present invention.

In monofilaments having amino acids immobilized by radiation-initiated graft polymerization, ion channels are insured as continuous entities that extend from one ion exchange membrane to an adjacent one and consistent water treatment can be achieved to provide good quality. Selection of fiber diameter and packing density depends on various factors such as flow rate, pressure loss and current efficiency and a suitable substrate may be selected or a selected substrates may be further processed. Woven or nonwoven fabrics which are fiber assembles can also be used as spacers by loading them between membranes and this offers the advantage of facilitating the operations of assembly, maintenance and inspection of equipment in the production process.

An exemplary method for immobilizing amino acids using radiation-initiated graft polymerization comprises grafting a polymerizable monomer containing epoxy groups which are highly reactive with amino groups and thereafter reacting said monomer with an amino acid. Common examples of the polymerizable monomer containing epoxy groups include but are not limited to glycidyl acrylate and glycidyl methacrylate. Besides the polymerizable monomer containing epoxy groups, any polymerizable monomers that permit introduction of amino acids can also be used. Amino acids are classified as a neutral amino acid, a basic amino acid or an acidic amino acid depending upon the relative proportions of two functional groups, an amino group and a carboxyl group, and a suitable amino acid can be selected in accordance with various factors such as use. It is also possible to use polyamino acids.

The present inventors previously proposed a method in which a cation exchanger and an anion exchanger produced separately by radiation-initiated graft polymerization were loaded in the demineralizing compartment. However, this method required that both types of ion-exchange groups (cation and anion exchange groups) be dispersed uniformly and that the ion exchangers be molded into an appropriate form that would not cause undue increase in pressure loss. According to the present invention, both types of ion-exchange groups are dispersed uniformly, so one only need to select a suitable substrate in consideration of several factors including the quality of water to be treated and the required quality of product water, as well as the flow rate for treatment and the pressure loss, and the need for molding the ion exchanger into an appropriate form is eliminated.

The following examples are provided for the purpose of further illustrating the present invention but are in no way to be taken as limiting.

Example 1

Bundles of polypropylene fiber having a diameter of 30 μm were showered with 200 kGy of electron beams from an accelerator (acceleration voltage 2 MeV; beam current, 1 mA) in a nitrogen atmosphere. The irradiated fiber bundles were immersed in a solution of acrylic acid and subjected to reaction at 40° C. for 8 h to achieve a graft efficiency of 52%. The thus obtained fibers were weak acidic cation-exchange fibers having an ion-exchange capacity of 4.8 meq/g. In a separate step, the same polypropylene fiber bundles were showered with accelerated electron beams in the manner just described above, immersed in a solution of chloromethylstyrene and subjected to reaction at 50° C. for 8 hours to achieve a graft efficiency of 186%. The thus obtained fibers were immersed in a 10% aqueous solution of dimethylamine and subjected to reaction at 50° C. for 2 h, yielding weak basic anion-exchange fibers having an ion-exchange capacity of 2.6 meq/g. The two types of ion-exchange fibers were processed as shown in FIG. 1 and the fabric thus prepared was loaded in the demineralizing compartment of an experimental electrodialyzing vessel. The demineralizing compartment of the dialyzing vessel measured 10 cm ×18 cm, with an intermembrane distance of 0.78 mm. The demineralizing compartment was composed of 10 cells and only one of them was used in the experiment. The net used as a spacer between membranes was cut off. Artificial raw water prepared by dissolving NaCl in pure water and adjusting its conductivity to ca. 10 μs/cm was supplied at a flow rate of 2 L/h. The treated water had an electric resistance of 18.9 MΩ·cm at an applied voltage of 50 V. Thus, the equipment constructed in Example 1 performed satisfactorily as an electrically regenerable demineralizing apparatus.

Example 2

The ion-exchange fibers prepared in example 1 were processed as shown in FIG. 1, except that the distance between adjacent fiber bundles was expanded by a factor of 4. Placed between adjacent bundles of those processed ion-exchange fibers were 10 mol (by wet volume) each of two conventional ion-exchange resins, i.e., a strong acidic cation-exchange resin (trade name: Dia-ion SKIB) and a strong basic anion-exchange resin (trade name: Dia-ion SA10A). A fabric thus prepared was packed in the demineralizing compartment of an experimental electrodialyzing vessel as in Example 1. The other conditions of experiment were the same as in Example 1. Compared to Example 1, the apparatus of Example 2 produced a high resistance to water passage but the quality of the treated water was almost the same (14.3 MΩ·cm in electric resistance) and its purity was very high. Thus, the equipment constructed in Example 2 also performed satisfactorily as an electrically regenerable demineralizing apparatus.

Example 3

A nonwoven Fabric having an areal density of ca. 50 g/m$^2$ that was formed of composite fibers (30 μm$^\phi$) having a Polypropylene core and a polyethylene sheath was showered with 200 kGy of electron beams from an accelerator (acceleration voltage, 2 MeV; beam current, 1 mA) in a nitrogen atmosphere. The irradiated fabric was immersed in a styrene solution chat was preliminarily freed of polymerization inhibitor and subjected to reaction as 50° C. for 8 hours to achieve a graft efficiency of 104%. The thus treated nonwoven fabric was sulfonated by immersion in a solution of 10% chlorosulfonic acid in 1,2-dichloroethane, thereby producing a nonwoven fabric of strong acidic cation-exchange fibers having a neutral salt decomposing capacity of 2.3 meq/g. In a separate step, the same nonwoven fabric was showered with accelerated electron beams in the manner just described above, immersed in a solution of chloromethylstyrene and subjected to reaction at 50° C. for 8 hours to achieve a graft efficiency of 129%. The thus treated nonwoven fabric was immersed in a 10% aqueous solution of trimethylamine and subjected to reaction at 50° C. for 2 hours, yielding a nonwoven fabric of strong basic anion-exchange fibers having a neutral salt decomposing capacity of 2.6 meq/g. The first mentioned nonwoven fabric had a cation-exchange capacity of 250 meq/m$^2$ and the second-mentioned nonwoven fabric had an anion-exchange capacity of 140 meq/m$^2$.

An electrodialyzing vessel having a demineralizing compartment with inside dimensions of 24 cm × 48 cm and an inter-membrane distance of 3 mm was packed with the two types of nonwoven fabrics that were cut to a smaller size of 24 cm × 12 cm and that were arranged, in order from the water feed end, to provide a block of strong basic anion-exchange fabrics, a block of strong acidic cation-exchange fabrics, a block of strong basic anion-exchange fabrics and a block of strong acidic cation-exchange fabrics, each block consisting of 6 sheets of fabric. Artificial raw water prepared by dissolving NaCl in pure water and adjusting its conductivity to ca. 10 μs/cm was supplied at a flow rate of 20 L/h. The treated water had an electric resistance of 14.8 MΩ·cm at an applied voltage of 80 V.

Example 4

A polypropylene net of substantially the same shape as the spacer net of the experimental electrodialyzing vessel (Model CS-O of Asahi Glass Co., Ltd.) used in Example 1 was irradiated with 200 kGy of y-rays in a nitrogen atmosphere, immersed in a solution of acrylic acid and subjected to reaction at 45° C. for 6 hours to attain a graft efficiency of 49%. The thus obtained fibers comprised a weak acidic cation-exchange net having an ion-exchange capacity of 4.3 meq/g. In a separate step, the same polypropylene net was irradiated with y-rays under the same conditions as described above, immersed in a solution of chloromethylstyrene and subjected to reaction at 50° C. for 8 hours to achieve a graft efficiency of 78%. The net was then immersed in a 10% aqueous solution of trimethylamine and subjected to reaction at 50° C. for 2 hours to yield a strong basic anion-exchange net having an ion-exchange capacity of 1.9 meq/g. Two sheets of each type of net were packed in the demineralizing compartment of an experimental electrodialyzing vessel (Model CS-O of Asahi Glass Co., Ltd.) as they were arranged in order from the water feed end, to provide a block of anion-exchange nets and a block of cation-exchange nets. Artificial raw water prepared by dissolving NaCl in pure water and adjusting its conductivity to ca.10 μs/cm was supplied at a flow rate of 5 L/h. The treated water had an electric resistance of 10.2 MΩ·cm at an applied voltage of 50 V.

Comparative Example 1

The spacer net originally fitted in the demineralizing compartment of the experimental electrodialyzing vessel used in Example 1 was used unaltered to treat raw water that was prepared by dissolving NaCl in pure water and adjusting its conductivity to ca. 10 μs/cm. The flow rate of the raw water was 5 L/h. The treated water had a conductivity of 1.3 MΩ·cm at an applied voltage of 50 V and a conductivity of 1.7 MΩ·cm at an applied voltage of 100 V. When the flow rate was changed to 2 L/h, the conductivity of the treated water was 1.5 MΩ·cm at an applied voltage of 50 V and 2.0 MΩ·cm at an applied voltage of 100 V.

Comparative Example 2

The spacer net originally fitted in the demineralizing compartment of the experimental electrodialyzing vessel used in Example 1 was mixed with 5 ml (by wet volume) of each of a strong acidic cation-exchange resin ("Dia-ion SKIB") and a strong basic anion-exchange resin ("Dia-ion SA10A") in such a way that they were distributed evenly. An experiment of water treatment was conducted under the same conditions as in Example 1. For the first 15 min of water feed, the treated water had an electric conductivity of 12 MΩ·cm but, thereafter, the conductivity dropped to less than 10 MΩ·cm and fluctuated between 2.5 and 7 MΩ·cm.

The spacer is placed between a cation- and an anion-exchange membrane in order to help water to be dispersed effectively and to insure that the two membranes will not contact each other. As one can see from the results of Examples 1–4 and Comparative Examples 1 and 2, water can be treated to high purity in a very simple way in accordance with the present invention by using a spacer formed of ion-exchange fibers produced by radiation-initiated graft polymerization or introducing ion-exchange groups through radiation-initiated graft polymerization into the net per se that is used as the spacer (see Example 4).

The use of conventional ion-exchange resins has also involved several problems as typified by the leakage of resins and the difficulty in achieving a uniform dispersion. In this respect, the present invention has the advantage of not only facilitating the production of equipment but also insuring consistent and effective treatment of water for a prolonged time.

Example 5

Figure 3:
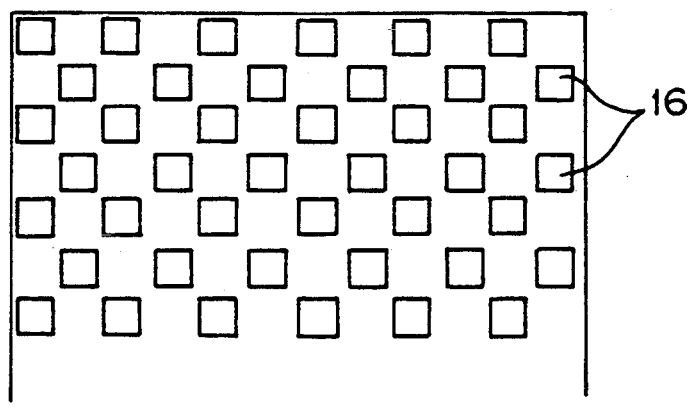
FIG. 3 is a diagram showing a shielding member that has openings for the passage of an electron beam and that may be used in the practice of the present invention.

A nonwoven fabric composed of polypropylene fibers (30 μm$^\phi$) to an areal density of 100 g/m$^2$ was covered with a shielding member in the form of a stainless steel sheet that had spaced openings as shown in FIG. 3. The fabric was showered with 200 kGy of electron beams from an accelerator (acceleration voltage, 2 MeV; beam current, 1 mA) in a nitrogen atmosphere, immersed in a solution of acrylic acid and subjected to reaction at 40° C. for 8 hours. Then, the same shielding member was replaced over the nonwoven fabric in such a way that it would just high those areas where acrylic acid was grafted, and the fabric was showered with accelerated electron beams under the same conditions as described above. Thereafter, the fabric was immersed in a solution of chloromethylstyrene and subjected to reaction at 50° C. for 7 hours, followed by immersion in a 10% aqueous solution of dimethylamine at 50° C. for 1 h to accomplish the amination of chloromethylstyrene. The thus treated nonwoven fabric had a cation-exchange capacity of 240 meq/m$^2$ and an anion-exchange capacity of 130 meq/m$^2$.

This nonwoven fabric was packed in the demineralizing compartment of an experimental electrodialyzing vessel and raw water was supplied under the same conditions as in Example 1. The treated water had an electric resistance of 12.8 MΩ·cm at an applied voltage of 100 V. Thus, the equipment constructed in Example 5 performed satisfactorily as an electrically regenerable demineralizing apparatus.

Example 6

A nonwoven fabric of the same type as used in Example 5 was showered with accelerated electron beams and subjected to graft polymerization under the same conditions as in Example 5, except that trimethylamine was used in the amination step to achieve conversion to a quaternary ammonium salt. The thus treated nonwoven fabric had a weak acidic and a strong basic ion-exchange group introduced in a mosaic pattern; it had a cation-exchange capacity of 240 meq/m$^2$ and an anion-exchange capacity of 115 meq/m$^2$.

This nonwoven fabric was loaded in the demineralizing compartment of an experimental electrodialyzing vessel and raw water was fed in under the same conditions as in Example 1. The treated water had an electric resistance of 14.9 MΩ·cm at an applied voltage of 100 V.

Example 7

A nowoven fabric composed of polypropylene fibers (80 μm$^\phi$) to an areal density of 50 g/m$^2$ was showered with 200 kGy of electron beams from an accelerator (acceleration voltage, 2 MeV: beam current, 1 mA) in a nitrogen atmosphere. Thereafter, the fabric was brought into contact with the vapor of glycidyl methacrylate at 50° C. for 8 hours to effect vapor-phase graft polymerization (graft efficiency, 150%). In the next place, the so treated nonwoven fabric was immersed in a solution composed of glycine (20 isopropyl alcohol (40 g), sodium hydroxide (9 g) and water (150 ml) and subjected to reaction at 80° C. for 4 hours. The obtained fabric had glycine immobilized in an amount of 1.9 mmol per gram of the reaction product. This nonwoven fabric was loaded in the demineralizing compartment of an experimental electrodialyzing vessel of the same type as used in Example 1 and racy water was supplied under the same conditions as in Example 1. The treated water had an electric resistance of 11.5 MΩ·cm at an applied voltage of 100 V. Thus the equipment constructed in Example 7 performed satisfactorily as an electrically regenerable demineralizing apparatus.

Example 8

A sheet of polyethylene sponge (thickness: 8 mm) was subjected to graft polymerization with glycidyl methacrylate under the same conditions as in Example 7, yielding a graft efficiency of 124%. The thus treated sheet was immersed in a solution composed of phenylalanine (10 g), isopropyl alcohol (50 g), sodium hydroxide (9 g) and water (159 ml) and subjected to reaction at 80° C. for 9 hours. The obtained sheet had phenylalanine immobilized in an amount of 1.8 mmol per gram of the reaction product. This sheet was loaded in the demineralizing compartment of an experimental electrodialyzing vessel of the same type as used in Example 1 and raw water was supplied under the same conditions as in Example 1. The treated water had an electric resistance of 12.1 MΩ·cm at an applied voltage of 100 V.

The conventional electrically regenerable demineralizing apparatus has beads of ion-exchange resins packed in the demineralizing compartment, so it has suffered from disadvantages in many aspects such as maintenance and management, the use of large equipment and the consistency of water treatment. In contrast, the apparatus of the present invention eliminates the need for packing a cation and an anion exchanger as separate entities and water of high purity can be obtained by treatment with a single type of nonwoven fabric which carries both cation- and anion-exchange groups. Accordingly, not only is it possible to construct demineralizing equipment of a simple design but its size can be easily increased, thereby eliminating many of the problems of the prior art.

What is claimed is:

1. In an electrically regenerable demineralizing apparatus having a demineralizing compartment between two ion exchange membranes for removing ions from a liquid, and an ion exchange material contained in said demineralizing compartment, the improvement comprising:

said ion exchange material is an ion exchange fiber having disposed upon it ion exchange groups, said ion exchange groups attached to said ion exchange fiber by radiation-initiated graft polymerization.

2. The ion exchange fiber of claim 1, wherein said ion exchange groups are selected from the group consisting of anion exchange groups, cation exchange groups, and mixtures thereof.

3. The ion exchange fiber of claim 2, wherein said anion exchange groups are selected from the group consisting of quaternary ammonium, tertiary amines, secondary amines, and primary amines; and said cation exchange groups are selected from the group consisting of sulfonic acids, phosphoric acids, and carboxylic acids.

4. The ion exchange fiber of claim 1, wherein said fiber is comprised of a polyolefin.

5. The ion exchange fiber of claim 1, wherein said radiation-initiated graft polymerization comprises graft polymerization of said ion exchange groups onto a preformed polymer fiber.

6. The ion exchange fiber of claim 7, further comprising said ion exchange resin formed from fibers prepared by radiation-initiated graft polymerization in combination with an ion exchange resin formed by means other than radiation-initiated graft polymerization.

7. In an electrically regenerable demineralizing apparatus having a demineralizing compartment between two ion exchange membranes for removing ions from a liquid, and an ion exchange material contained in said demineralizing compartment, the improvement comprising:

said ion exchange material is an ion exchange fiber formed of a composite fiber having a polypropylene core and a polyethylene sheath upon which ion exchange groups are disposed, said ion exchange groups attached to said polyethylene sheath by radiation-initiated graft polymerization.

8. The ion exchange fiber of claim 7, wherein said ion exchange groups are selected from the group consisting of anion exchange groups, cation exchange groups and mixtures thereof.

9. The ion exchange fiber of claim 8, wherein said anion exchange groups are selected from the group consisting of quaternary ammonium, tertiary amines, secondary amines and primary amines; and said cation exchange groups are selected from the group consisting of sulfonic acid, phosphoric acid and carboxylic acid groups.

10. The ion exchange fiber of claim 7, wherein, in said radiation-initiated graft polymerization, graft polymerization of said ion exchange groups onto a preformed polymer fiber occurs.

* * * * *